United States Patent
Kurashima et al.

(10) Patent No.: US 7,499,020 B2
(45) Date of Patent: Mar. 3, 2009

(54) INPUT SYSTEM AND INPUT DEVICE

(75) Inventors: Shigemi Kurashima, Shinagawa (JP);
Masahiro Yanagi, Shinagawa (JP);
Masaya Endo, Shinagawa (JP); Shinobu Sasaki, Shinagawa (JP); Norio Endo, Shinagawa (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 594 days.

(21) Appl. No.: 09/838,170

(22) Filed: Apr. 20, 2001

(65) Prior Publication Data

US 2002/0057254 A1 May 16, 2002

(30) Foreign Application Priority Data

Nov. 14, 2000 (JP) ............................. 2000-346994

(51) Int. Cl.
*G09G 5/00* (2006.01)
(52) U.S. Cl. ...................... 345/156; 345/158; 345/163; 455/227.1
(58) Field of Classification Search ......... 345/156–158, 345/163, 161, 166; 369/44, 23; 340/573.4; 455/67.13, 69, 115.3, 277.1
See application file for complete search history.

(56) References Cited

U.S. PATENT DOCUMENTS

| | | | | |
|---|---|---|---|---|
| 4,602,357 A | * | 7/1986 | Yang et al. | ...................... 367/93 |
| 4,696,058 A | * | 9/1987 | Tachita et al. | ............. 455/277.1 |
| 6,115,030 A | * | 9/2000 | Berstis et al. | ................ 345/161 |
| 6,229,526 B1 | * | 5/2001 | Berstis | ........................ 345/158 |
| 6,359,610 B1 | * | 3/2002 | Shah et al. | ................... 345/156 |
| 6,411,279 B1 | * | 6/2002 | Tseng et al. | ................. 345/163 |
| 6,441,804 B1 | * | 8/2002 | Hsien | .......................... 345/158 |
| 6,445,379 B1 | * | 9/2002 | Liu et al. | ..................... 345/163 |
| 6,459,421 B1 | * | 10/2002 | Cho et al. | .................... 345/166 |
| 6,539,050 B1 | * | 3/2003 | Lee et al. | ..................... 375/146 |
| 6,564,044 B1 | * | 5/2003 | Rilling | ..................... 455/277.1 |
| 6,714,133 B2 | * | 3/2004 | Hum et al. | ............... 340/573.4 |
| 6,915,112 B1 | * | 7/2005 | Sutton et al. | ............. 455/67.13 |
| 6,957,081 B2 | * | 10/2005 | Leyh et al. | ............... 455/553.1 |
| 2002/0033803 A1 | * | 3/2002 | Holzrichter et al. | ......... 345/158 |
| 2003/0030619 A1 | * | 2/2003 | Martin et al. | ................ 345/156 |
| 2003/0100324 A1 | * | 5/2003 | Kasapi | ........................ 455/504 |

* cited by examiner

*Primary Examiner*—Richard Hjerpe
*Assistant Examiner*—Kimnhung Nguyen
(74) *Attorney, Agent, or Firm*—Staas & Halsey LLP

(57) ABSTRACT

An input system includes an information generation part which generates input information based on a given input operation, a transmission part which transmits signals generated by having a plurality of different carrier frequencies modulated with the input information, and a reception part which receives the transmitted signals and demodulates the signals into the input information.

8 Claims, 20 Drawing Sheets

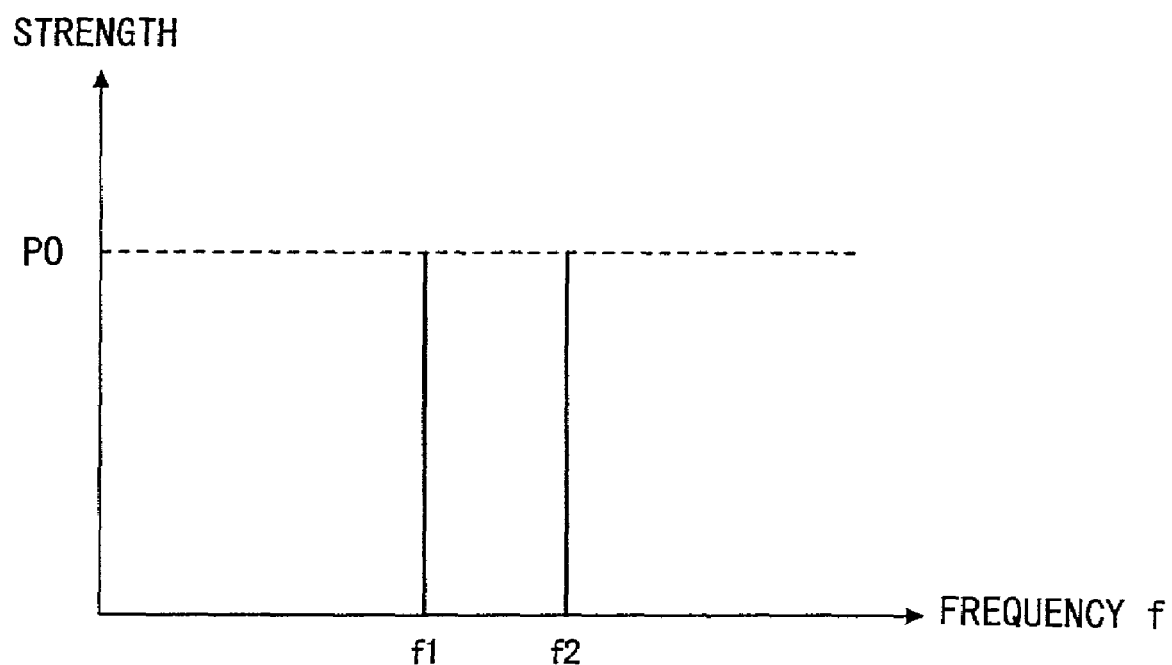

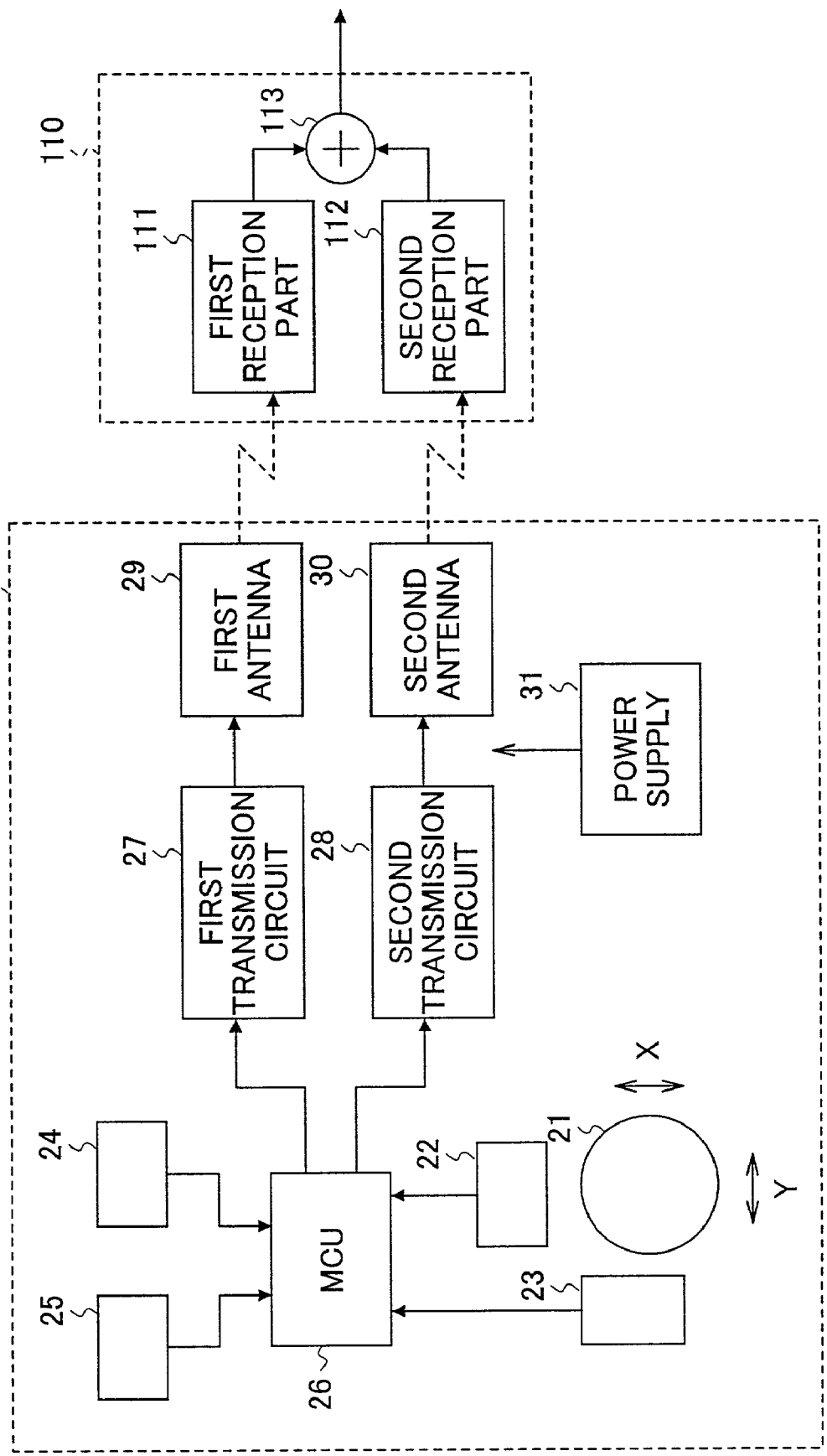

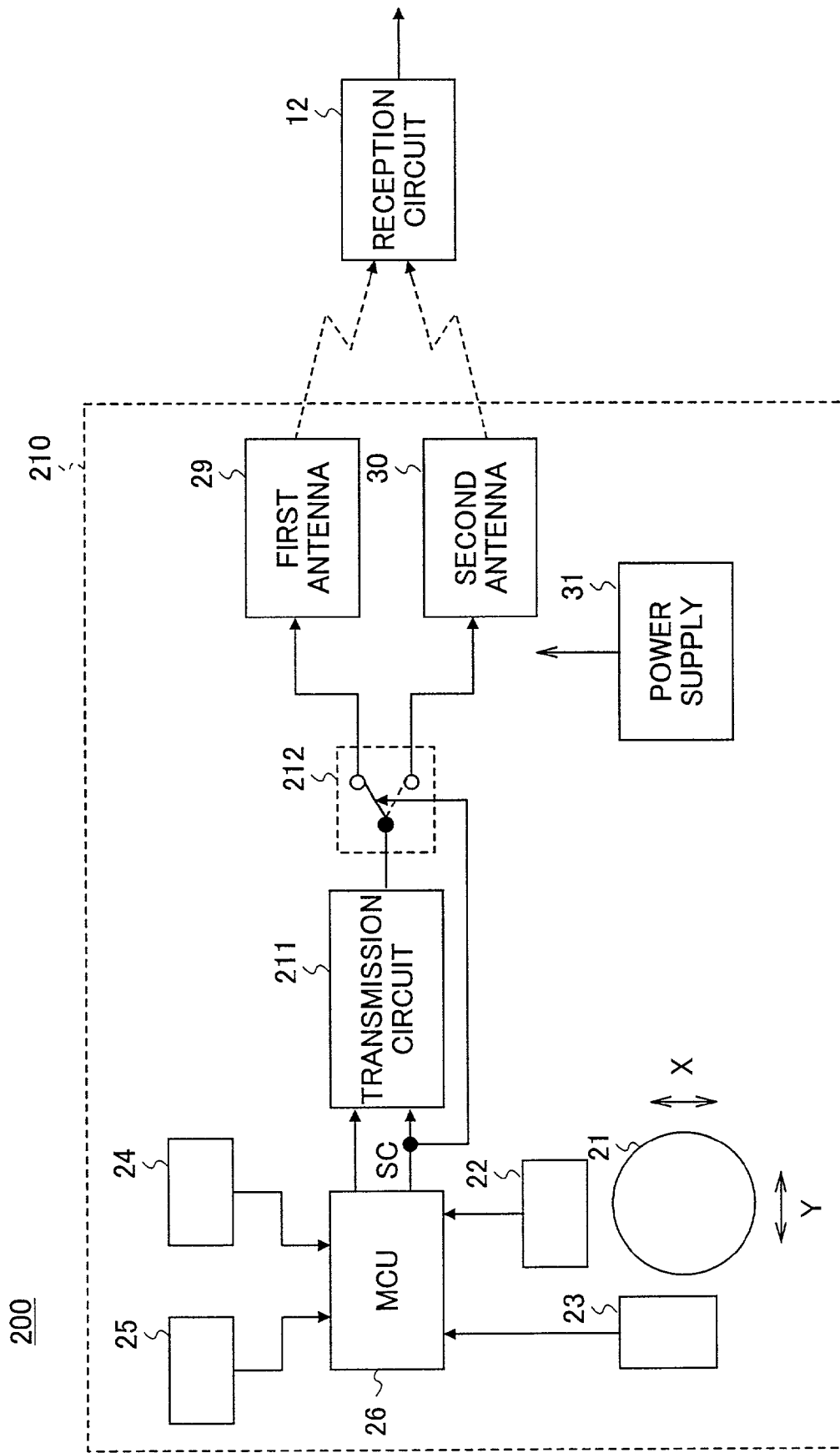

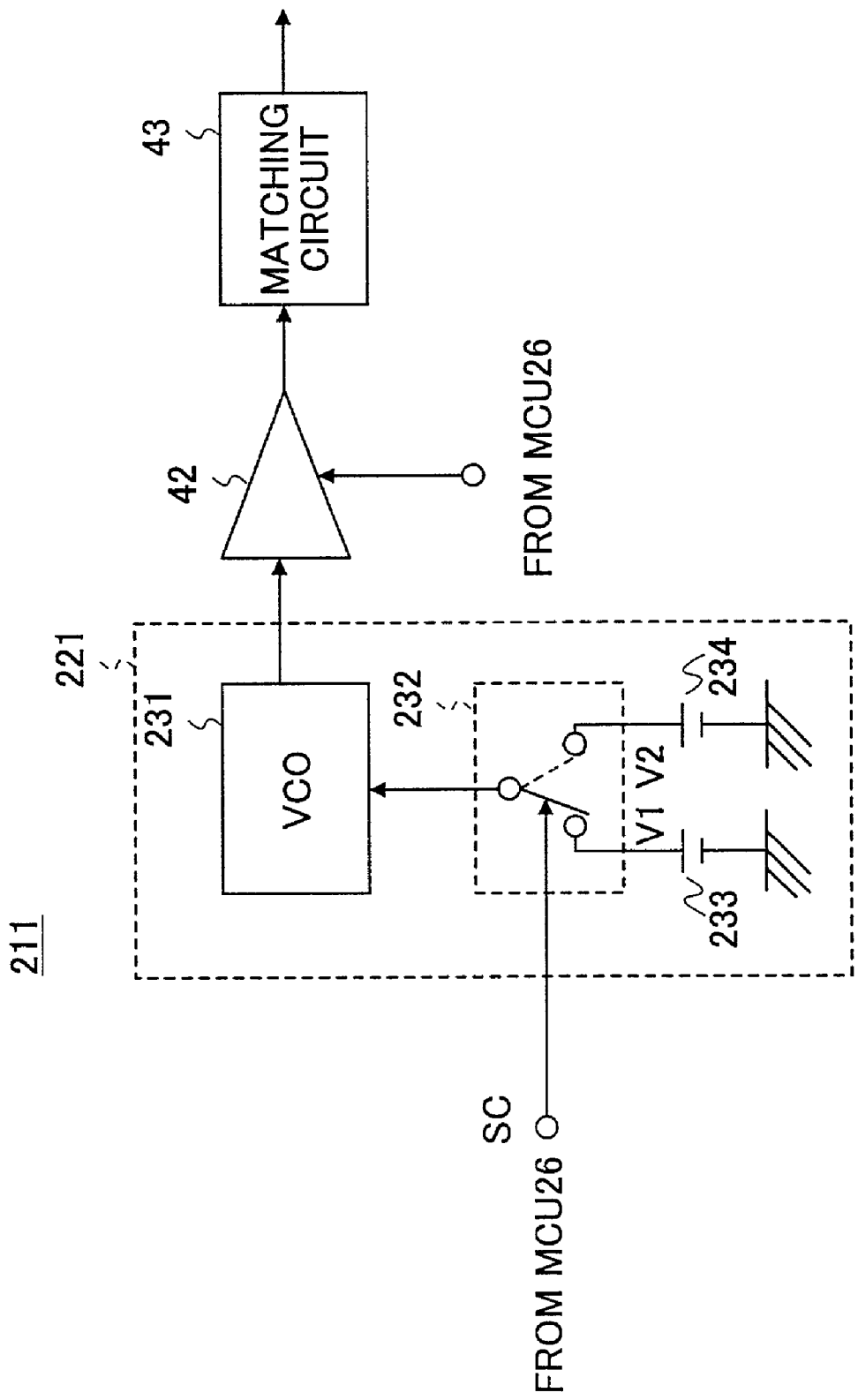

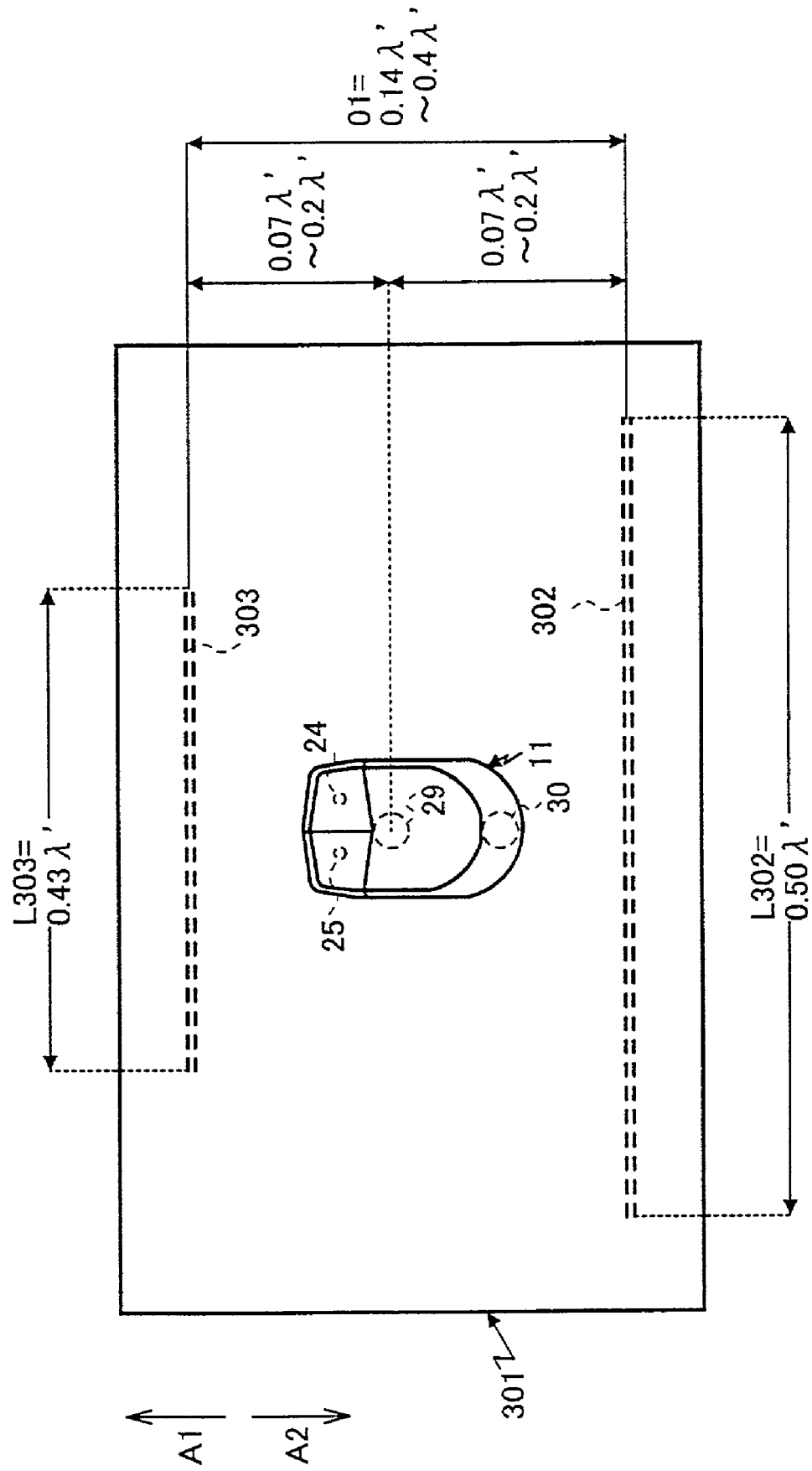

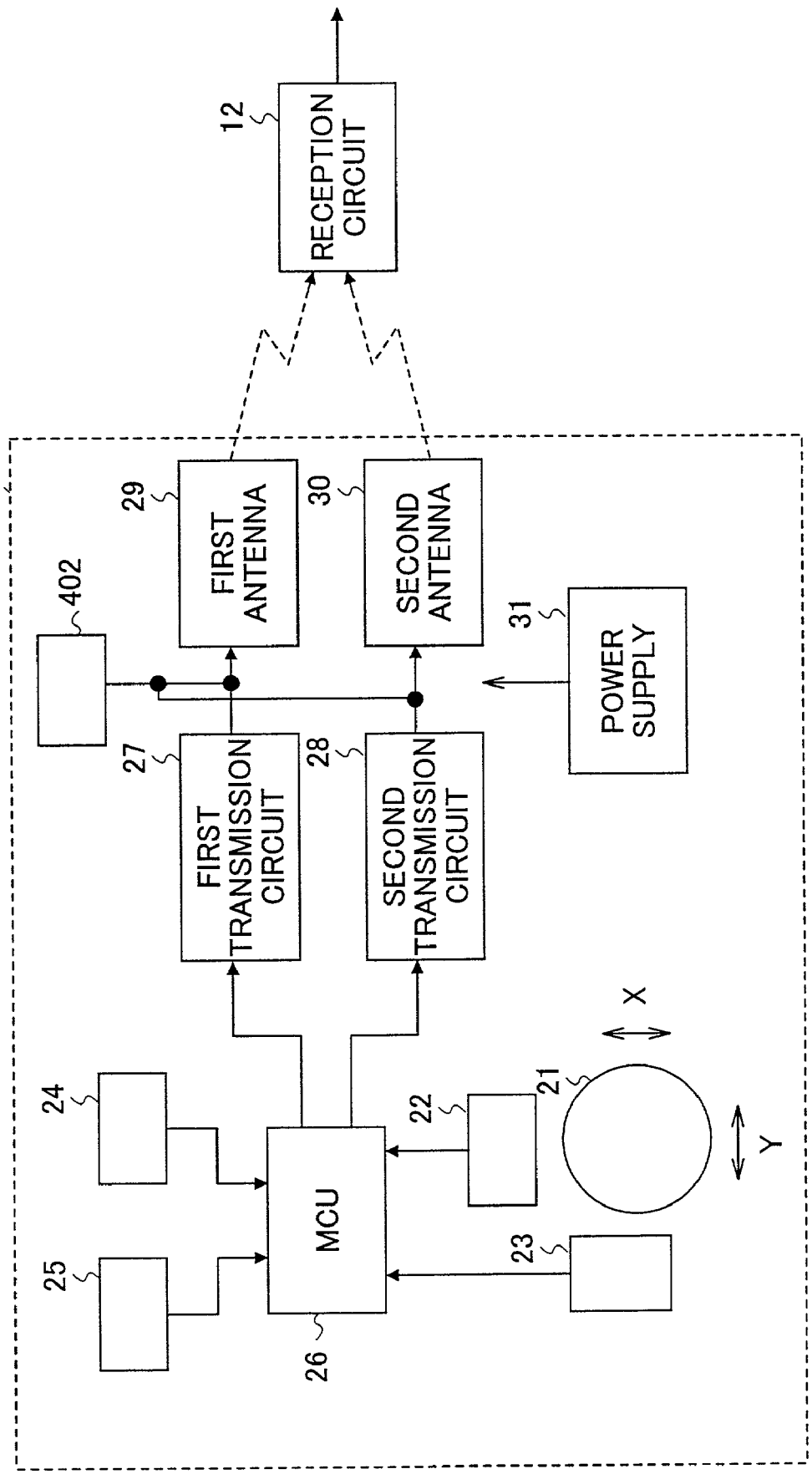

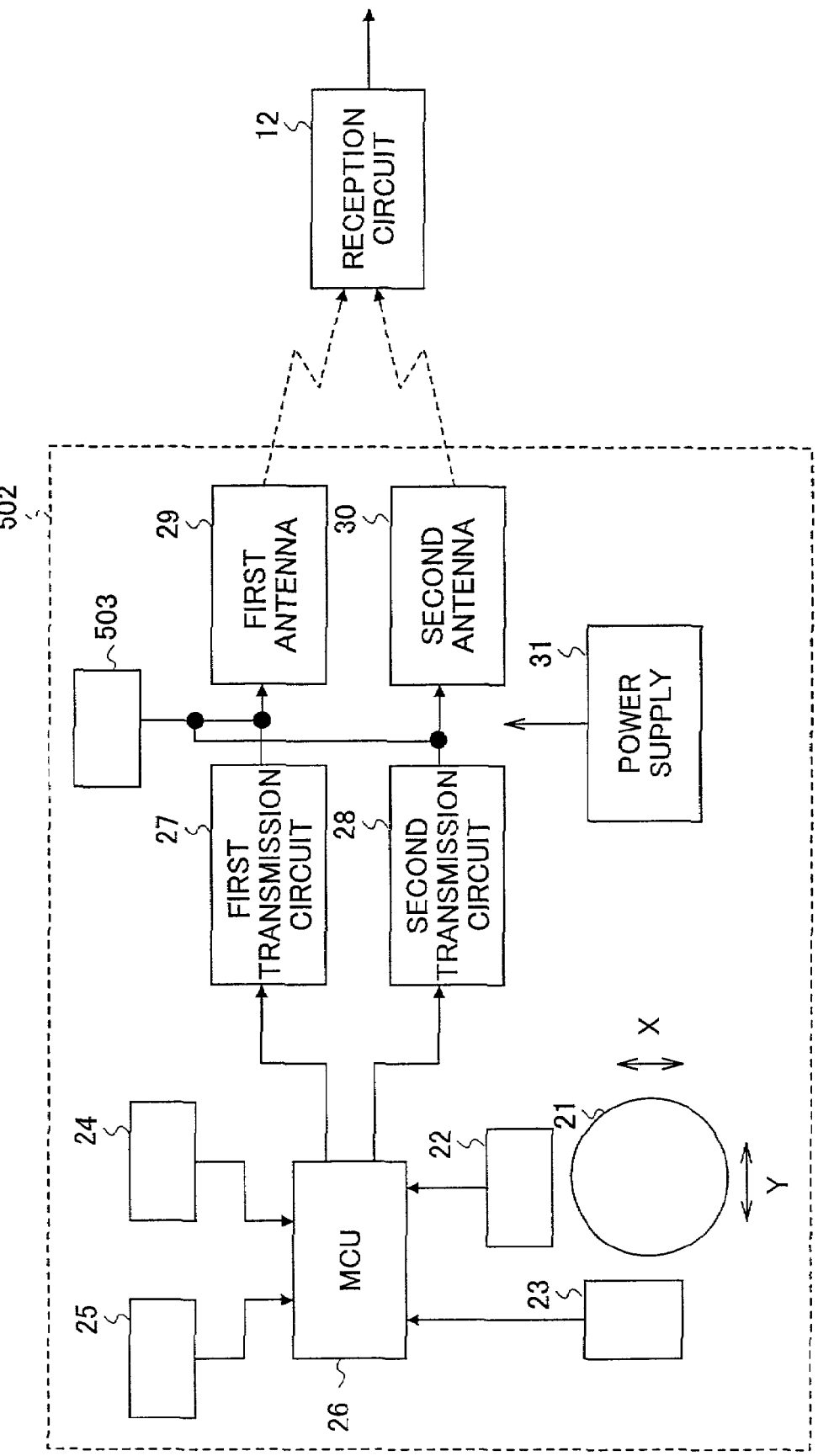

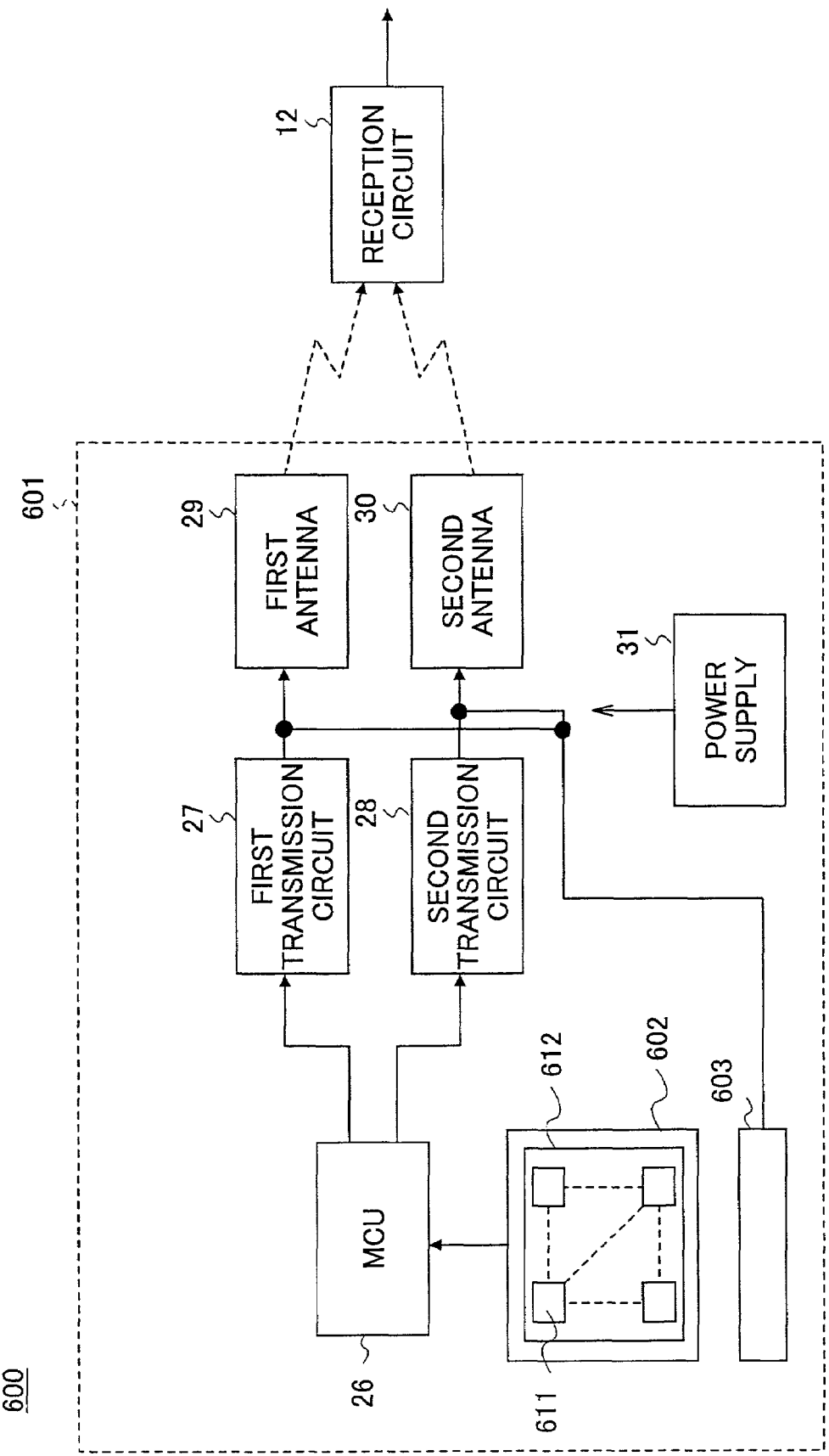

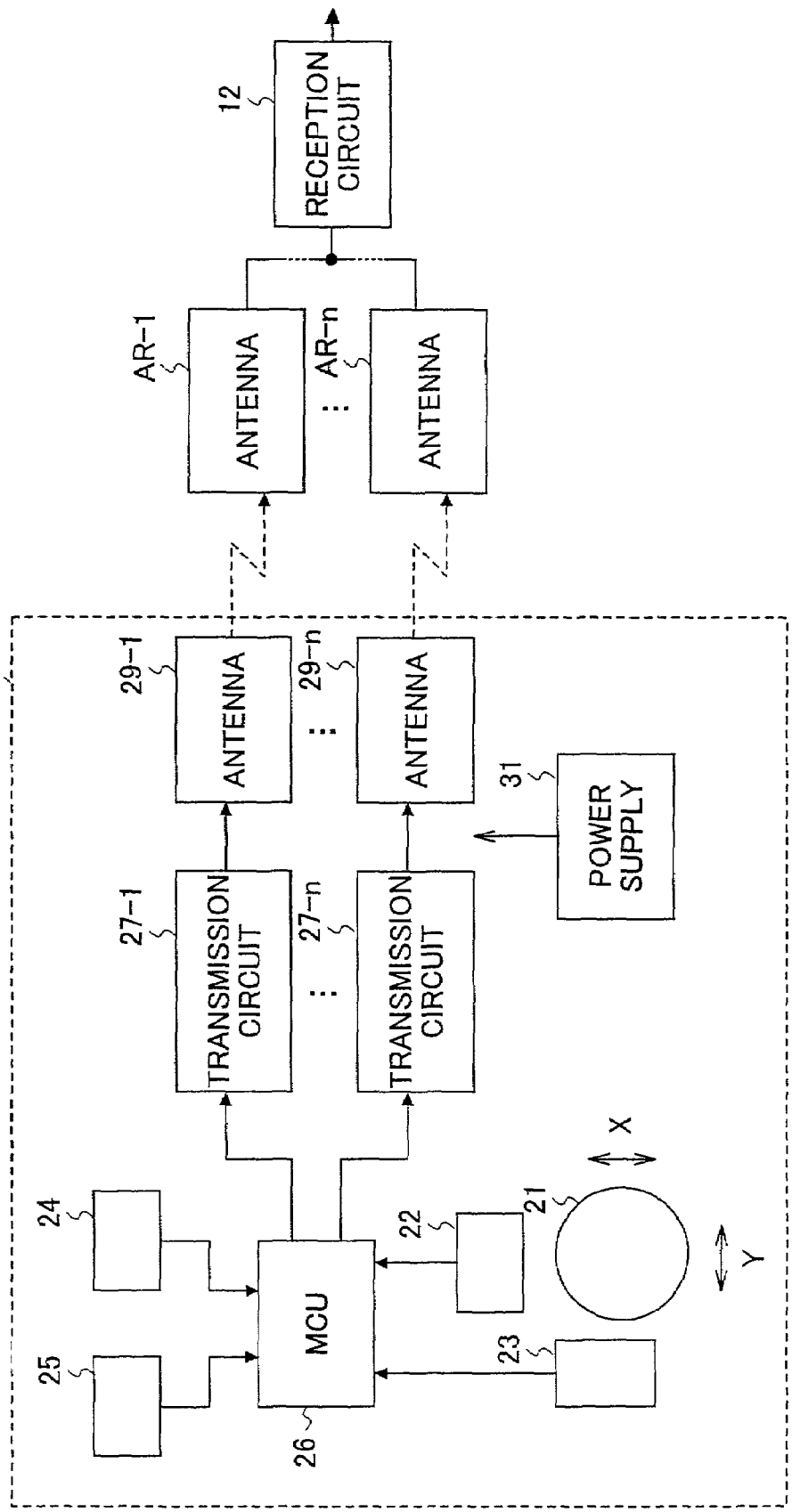

INPUT SYSTEM AND INPUT DEVICE

BACKGROUND OF THE INVENTION

1. Field of the Invention

The present invention generally relates to input systems and input devices, and more particularly to an input system in which information input by radio communication is transmitted and an input device that transmits information input by radio communication.

Recently, there has been a demand for wireless HIDs (Human Interface Devices) to improve the operability of computers. Radio communication methods employing infrared (Ir) lights or radio frequency (RF) electromagnetic waves have been conventionally employed in the wireless HIDs. In these methods, methods employing the RF electromagnetic waves have received attention since the RF electromagnetic waves have good transmissiveness.

2. Description of the Related Art

However, legal restrictions on radio waves restrict transmission power in radio communication employing the RF electromagnetic waves, which makes a communicable distance of the RF radio communication insufficient. Further, the legal restrictions prevent sufficient electric field strength to receive radio waves from being obtained. Therefore, the majority of conventional wireless input devices employ the Ir lights.

SUMMARY OF THE INVENTION

It is a general object of the present invention to provide an input system and an input device in which the above-described disadvantage is eliminated.

A more specific object of the present invention is to provide an input system and an input device which realize good information communication.

The above objects of the present invention are achieved by an input system including an information generation part which generates input information based on a given input operation, a transmission part which transmits signals generated by having a plurality of different carrier frequencies modulated with the input information, and a reception part which receives the transmitted signals and demodulates the signals into the input information.

According to the above-described input system, since the signals generated by having the carrier frequencies modulated with the input information are transmitted, a received signal level can be raised even if each carrier frequency has weak electric field strength.

The above objects of the present invention are also achieved by an input system including an information generation part which generates input information based on a given input operation, a transmission part which transmits a signal generated by having a carrier frequency modulated with the input information, a plurality of wave direction parts which are provided close to the transmission part so as to provide the signal transmitted from the transmission part with directivity, and a reception part which receives the transmitted signal and demodulates the signal into the input information.

According to the above-described input system, space diversity effect can be obtained by outputting the same data of the same carrier frequency from the wave direction parts. Therefore, an efficient signal transmission can be performed irrespective of an input device state.

The above objects of the present invention are also achieved by an input device including an information generation part which generates input information based on a given input operation, and a transmission part which transmits signals generated by having a plurality of different carrier frequencies modulated with the input information.

According to the above-described input device, since the signals generated by having the carrier frequencies modulated with the input information are transmitted, a received signal level can be raised even if each carrier frequency has weak electric field strength.

The above objects of the present invention are further achieved by an input device including an information generation part which generates input information based on a given input operation, a transmission part which transmits a signal generated by having a carrier frequency modulated with the input information, and a plurality of wave direction parts which are provided close to the transmission part so as to provide the signal transmitted from the transmission part with directivity.

According to the above-described input device, space diversity effect can be obtained by outputting the same data of the same carrier frequency from the wave direction parts. Therefore, an efficient signal transmission can be performed irrespective of an input device state.

BRIEF DESCRIPTION OF THE DRAWINGS

Other objects, features and advantages of the present invention will become more apparent from the following detailed description when read in conjunction with the accompanying drawings, in which:

FIG. 4 is a diagram showing transmission signal strength for carrier frequencies f1 and f2 of the first embodiment;

FIG. 7 is a block diagram of an input system according to a second embodiment of the present invention;

FIG. 8 is a block diagram of an input system according to a third embodiment of the present invention;

FIG. 9 is a block diagram of a transmission circuit of the third embodiment;

FIG. 10 is a diagram showing an input system according a fourth embodiment of the present invention;

FIG. 11 is a block diagram of an input system according to a fifth embodiment of the present invention;

FIG. 14 is a block diagram of the input system of the sixth embodiment;

FIG. 16 is a block diagram of an input system according to a seventh embodiment of the present invention;

FIG. 20 is a block diagram of an input system according to a ninth embodiment of the present invention.

DETAILED DESCRIPTION OF THE PREFERRED EMBODIMENTS

A description will now be given, with reference to the accompanying drawings, of embodiments of the present invention.

Figure 1:
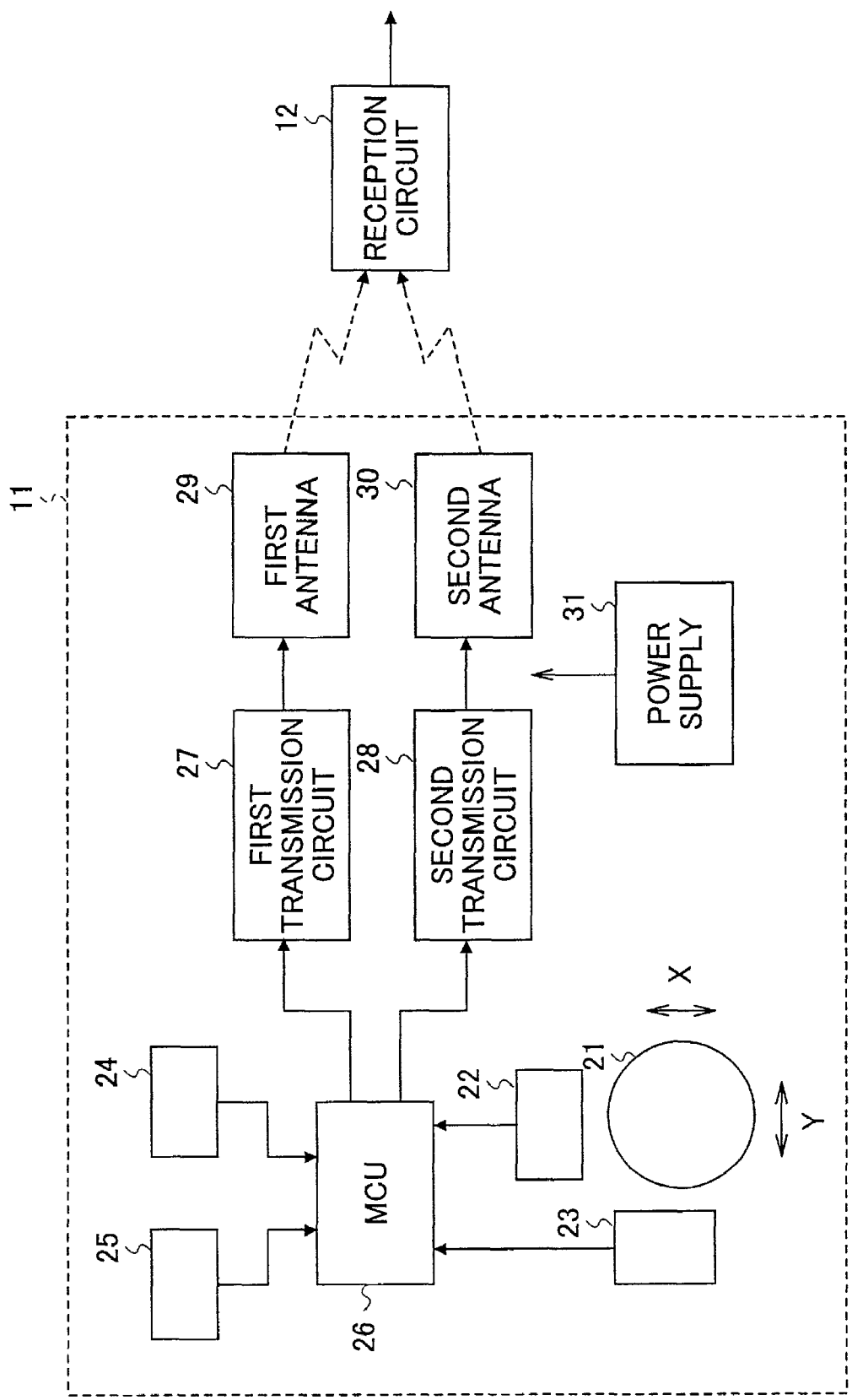
FIG. 1 is a block diagram of an input system according to a first embodiment of the present invention.

FIG. 1 is a block diagram of an input system 1 according to a first embodiment of the present invention.

The input system 1 is applied as an input system for a computer. The input system 1 includes an input device 11 and a reception circuit 12. Information input from the input device 11 is supplied via two radio communication paths to the reception circuit 12. The reception circuit 12 supplies the information from the input device 11 to the computer.

The input device 11 is a mouse and includes a coordinate detection ball 21, sensors 22 and 23, switches 24 and 25, a microprogram control unit (MCU) 26, first and second transmission circuits 27 and 28, first and second antennas 29 and 30, and a power supply 31.

Each of the sensors 22 and 23 includes a rotary encoder and generates pulses whose number corresponds to a rotational displacement amount of the coordinate detection ball 21. The detection results of each of the sensors 22 and 23 are supplied to the MCU 26. The MCU 26 computes displacement amounts in X and Y directions based on the pulses supplied from the sensors 22 and 23, respectively. The MCU 26 detects a click operation by turning the switches 24 and 25 ON.

The MCU 26 generates input information corresponding to an input operation of a user based on the pulses supplied from the sensors 22 and 23, and "ON" signals supplied from the switches 24 and 25. Then, the MCU 26 supplies the input information to the first and second transmission circuits 27 and 28.

The first transmission circuit 27 has a first carrier frequency f1 modulated with the input information supplied from the MCU 26 by using a predetermined modulation method such as FSK (Frequency Shift Keying) or ASK (Amplitude Shift Keying). The second transmission circuit 28 has a second carrier frequency f2 modulated with the input information supplied from the MCU 26 by using a predetermined modulation method such as FSK (Frequency Shift Keying) or ASK (Amplitude Shift Keying). The second carrier frequency f2 is higher than the first carrier frequency f1. The modulation methods used in the first and second transmission circuits 27 and 28 are not limited to FSK or ASK, and other modulation methods may be used. That is, the first and second transmission circuits 27 and 28 are not limited in the modulation methods. A spread spectrum may also be used for the modulation.

Figure 2:
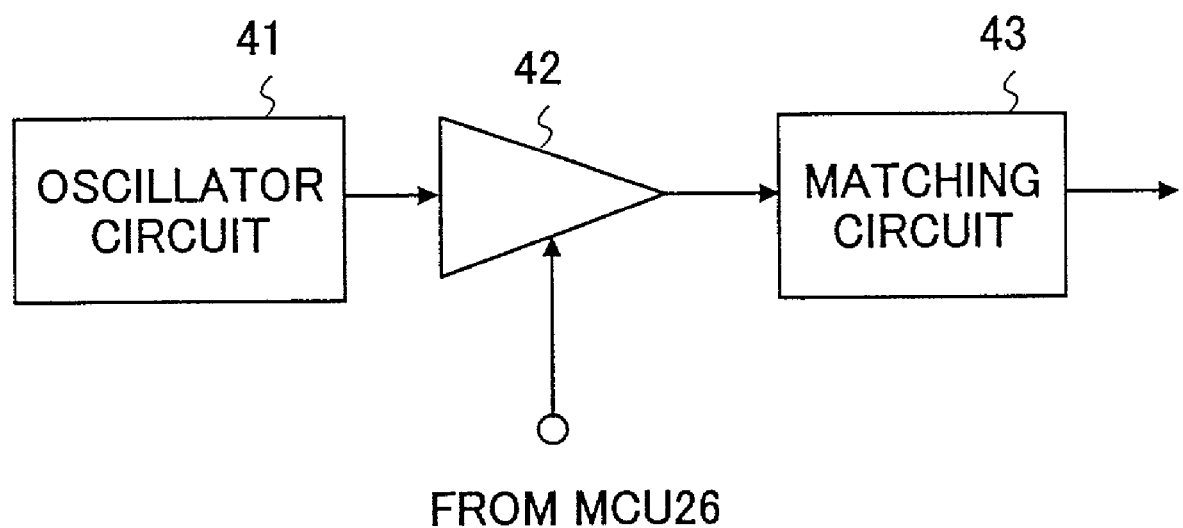
FIG. 2 is a block diagram of a first transmission circuit of the first embodiment.

FIG. 2 is a block diagram of the first transmission circuit 27 according to the first embodiment of the present invention.

The first transmission circuit 27 shown in FIG. 2 includes an oscillator circuit 41, an amplifier 42, and a matching circuit 43, and employs a modulation method of ASK. The second transmission circuit 28 has the same structure as the first transmission circuit 28.

The oscillator circuits 41 of the first and second transmission circuits 27 and 28 generate carrier waves of the first and second carrier frequencies f1 and f2, respectively. The carrier waves generated by the oscillator circuits 41 are supplied to the respective amplifiers 42.

Each of the amplifiers 42 of the first and second transmission circuits 27 and 28 forms an amplitude modulation circuit, and amplifies the carrier wave by an amplification factor corresponding to the input information supplied from the MCU 26 so as to have the carrier wave amplitude-modulated with an information signal. The output signals of the amplifiers 42 of the first and second transmission circuits 27 and 28 are supplied via the respective matching circuits 43 to the first and second antennas 29 and 30, respectively.

Each of the matching circuits 43 of the first and second transmission circuits 27 and 28 performs impedance matching. The values of the circuit elements of each of the matching circuits 43 are provided so that an optimum impedance matching is performed when the user operates the mouse for input operations.

Figure 3:
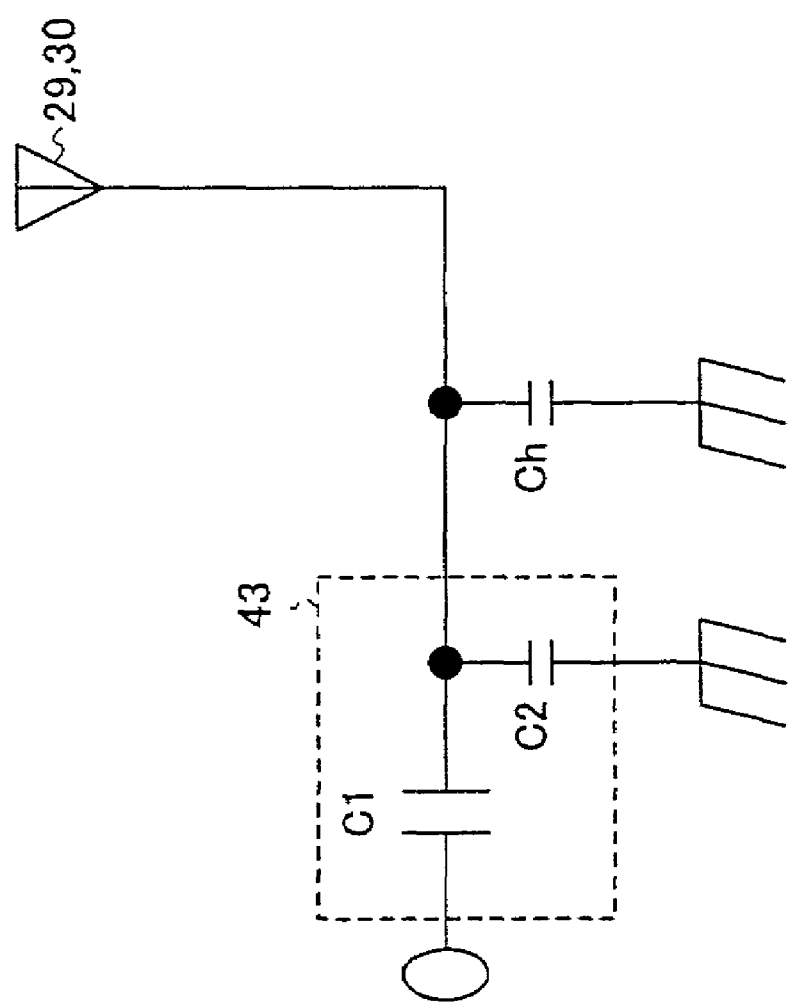
FIG. 3 is a diagram showing a structure of each of matching circuits of the first transmission circuit and a second transmission circuit of the first embodiment.

FIG. 3 is a diagram showing a structure of each of the matching circuits 43 of the first and second transmission circuits 27 and 28 according to the first embodiment of the present invention.

The matching circuits 43 of the first transmission circuit 27 has a capacitor C1 connected in series between the amplifier 42 and the first antenna 29, and a capacitor C2 connected between a connection of the capacitor C1 and the first antenna 29, and a ground. Further, if the user touches the mouse for an operation, a capacitor Ch, for instance, is added between the matching circuit 43 and the first antenna 29. The capacitance of each of the capacitors C1 and C2 is provided in consideration of the capacitance of the capacitor Ch. Thereby, the optimum impedance matching can be achieved when the user operates the mouse for input operations. The matching circuit 43 of the second transmission circuit 28 has the same structure as that of the first transmission circuit 27.

The first and second transmission circuits 27 and 28 employ the different carrier frequencies f1 and f2 (>f1), respectively.

Transmission signals modulated in the respective transmission circuits 27 and 28 are radiated outside from the first and second antennas 29 and 30, respectively. At this time, the input information supplied from the MCU 26 is radiated from the first and second antennas 29 and 30, respectively, substantially at the same time.

FIG. 4 is a diagram showing transmission signal strength for the carrier frequencies f1 and f2 of the first embodiment of the present invention. In FIG. 4, a strength P0 is a value specified by the legal restrictions on radio waves.

The strengths of radio waves radiated from the first and second antennas 29 and 30 are adjusted so as not to exceed the specified value P0 as shown in FIG. 4. The adjustment of the radio wave strength is performed, for instance, by setting the amplification factor of each of the amplifiers 42.

Figure 5A:
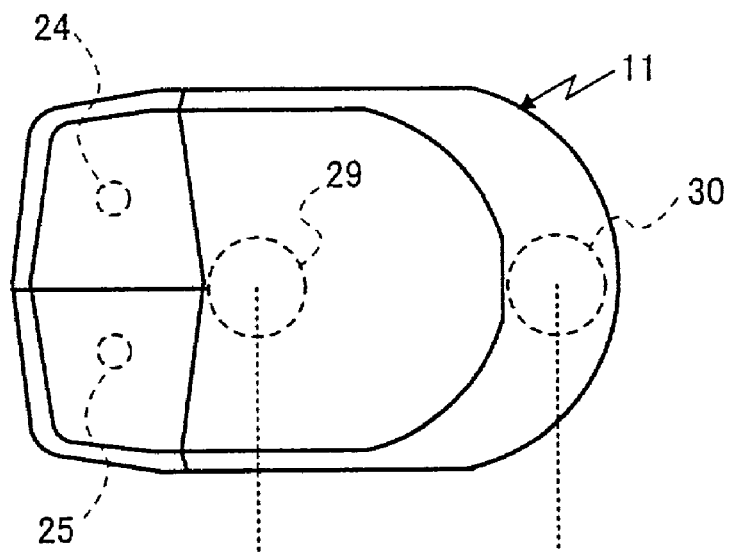
FIGS. 5A and 5B are a top plan view and a side view of an input device of the first embodiment, respectively.
Figure 5B:
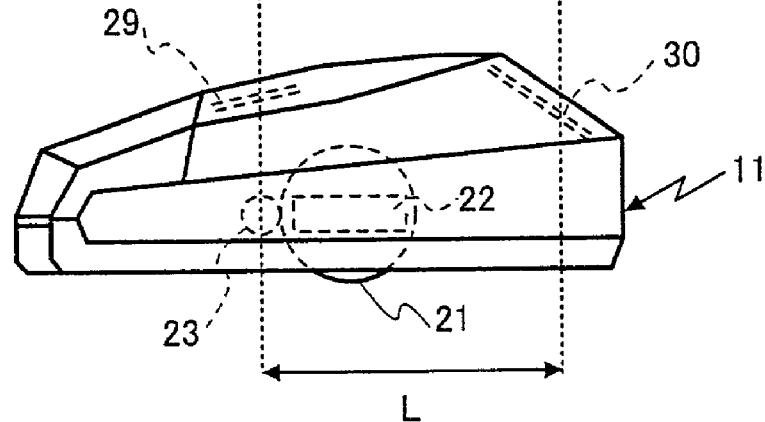

FIGS. 5A and 5B are a top plan view and a side view of the input device 11, respectively, showing an arrangement of the antennas 29 and 30 of the first embodiment of the present invention.

The first and second antennas 29 and 30 are arranged apart from each other by a distance L in a direction in which the first and second antennas 29 and 30 are desired to have directivity. Letting a cycle of a carrier frequency be $\lambda$, the distance L is set to approximately $\frac{1}{2}\lambda$ or below, specifically, $\frac{1}{8}\lambda$, for instance.

Suppose that each of the carrier frequencies f1 and f2 of the first and second transmission circuits 27 and 28 is approximately 320 MHz, $\frac{1}{8}\lambda$ is approximately 10 cm.

By thus setting the distance L between the first and second antennas 29 and 30 to approximately ⅛λ, the radio waves radiated from the first and second antennas 29 and 30 are allowed to compensate for a decrease in each other's electric field strength according to a communication distance.

Figure 6:
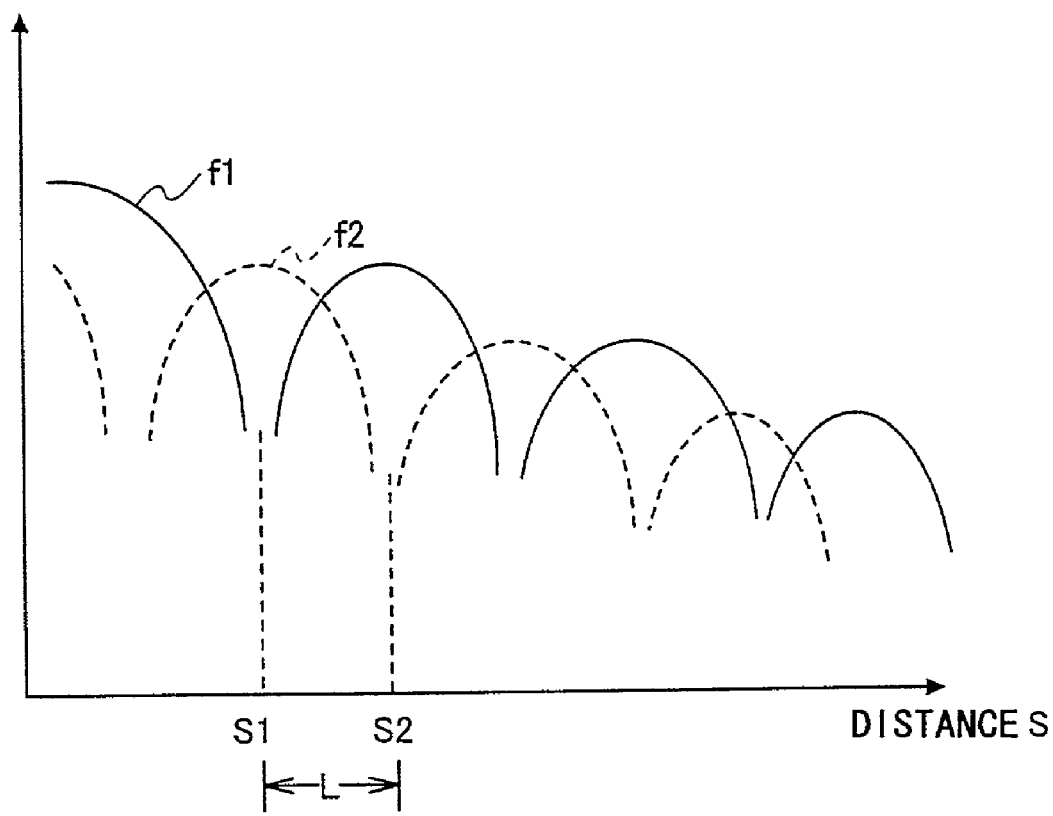
FIG. 6 is a diagram showing characteristics of electric field strengths of the carrier frequencies f1 and f2 according to a distance between a reception antenna and a first antenna and a distance between the reception antenna and a second antenna, respectively.

FIG. 6 is a diagram showing the characteristics of the electric field strengths of the carrier frequencies f1 and f2 according to a distance between a reception antenna and the first antenna 29 and a distance between the reception antenna and the second antenna 30, respectively. In FIG. 6, solid and broken lines indicate the electric field strengths of the carrier frequencies f1 and f2 radiated from the first and second antennas 29 and 30, respectively.

By setting the distance L between the first and second antennas 29 and 30 to approximately ⅛λ, the characteristics of the electric field strengths of the carrier frequencies f1 and f2 are obtained as shown in FIG. 6. As shown in FIG. 6, the electric field strength of the radio wave radiated from the second antenna 30 reaches a peak level at a distance S1 where the electric field strength of the radio wave radiated from the first antenna 29 reaches a lowest level. On the other hand, the electric field strength of the radio wave radiated from the first antenna 29 reaches a peak level at a distance S2 where the electric field strength of the radio wave radiated from the second antenna 30 reaches a lowest level. Thus, the radio waves can compensate for a decrease in each other's electric field strength. Therefore, the electric field strengths of the radio waves are prevented from being lowered significantly irrespective of a position of the mouse. Thereby, the input information is reliably transmittable to a receiver.

The radio waves radiated from the first and second antennas 29 and 30 are received by the reception circuit 12 shown in FIG. 1.

The reception circuit 12 includes an amplitude demodulation circuit, and receives the radio waves from the first and second antennas 29 and 30 to demodulate the transmission signals into the original information signals. At this time, the reception circuit 12 is allowed to selectively receive and demodulate the transmission signals of the carrier frequencies f1 and f2. Therefore, the output signal of the reception circuit 12 is the combination of the information signals obtained by demodulating the modulated waves of the carrier frequencies f1 and f2, respectively. Therefore, the output signal of the reception circuit 12 is approximately twice as strong as a signal obtained by demodulating a modulated wave of a single carrier frequency. The information signals obtained by demodulation in the reception circuit 12 are supplied to the computer, where the information signals are recognized as the input information to be used for control of coordinate positions of a pointer or instructions on icon selection.

Thus, according to the input system 1 of this embodiment, signals can be received efficiently with weaker electric field strength.

In this embodiment, the reception circuit 12 is formed to simultaneously receive and demodulate modulated waves of different carrier frequencies. However, a reception part may be provided for each of the modulated waves of the different carrier frequencies.

FIG. 7 is a block diagram of an input system 100 according to a second embodiment of the present invention. In FIG. 7, the same elements as those of FIG. 1 are referred to by the same numerals, and a description thereof will be omitted.

The input system 100 differs from the input system 1 of FIG. 1 in a reception circuit structure. A reception circuit 110 of this embodiment includes first and second reception parts 111 and 112 for receiving the radio waves of the first and second carrier frequencies f1 and f2 transmitted from the first and second antennas 29 and 30, respectively, and a synthesis part 113 that synthesizes first and second received signals from the first and second reception parts 111 and 112, respectively.

According to this embodiment, the radio waves of the first and second carrier frequencies f1 and f2 are individually received and then synthesized. Therefore, the radio waves are efficiently received and demodulated, so that received signal levels can be raised.

According to the first and second embodiments, the separate first and second transmission circuits 27 and 28 are provided. However, a signal transmission may be performed through a single transmission circuit by alternating between the first and second carrier frequencies f1 and f2.

FIG. 8 is a block diagram of an input system 200 according to a third embodiment of the present invention. In FIG. 8, the same elements as those of FIG. 1 are referred to by the same numerals, and a description thereof will be omitted.

The input system 200 differs from the input system 1 of FIG. 1 in an input device structure. An input device 210 of this embodiment includes a transmission circuit 211 and a switching circuit 212 instead of the first and second transmission circuits 27 and 28 of the input device 11 of FIG. 1.

A switching control signal Sc supplied from the MCU 26 allows the transmission circuit 211 to transmit a signal alternately to the first and second antennas 29 and 30. By thus outputting the same data of the same carrier frequency alternately from the first and second antennas 29 and 30, a space diversity effect can be produced. Therefore, a signal can be efficiently transmitted irrespective of a state of the input device 210.

FIG. 9 is a block diagram of the transmission circuit 211 of the third embodiment of the present invention. In FIG. 9, the same elements as those of FIG. 2 are referred to by the same numerals, and a description thereof will be omitted.

The transmission circuit 211 of this embodiment differs from the first or second transmission circuit 27 or 28 shown in FIG. 2 in an oscillator circuit structure. An oscillator circuit 221 of this embodiment includes a voltage-controlled oscillator (VCO) 231, a switching circuit 232, and constant-voltage power supplies 233 and 234.

A voltage V1 or V2 from the constant-voltage power supply 233 or 234 is applied to the VCO 231 through the switching circuit 232. The VCO 231 oscillates at the first carrier frequency f1 if the voltage V1 from the constant-voltage power supply 233 is applied thereto, and oscillates at the second carrier frequency f2 if the voltage V2 from the constant-voltage power supply 234 is applied thereto.

The switching circuit 232 is switched so as to apply the voltage V1 from the constant-voltage power supply 233 to the VCO 231 if the level of the switching control signal Sc supplied from the MCU 26 is HIGH, and the voltage V2 from the constant-voltage power supply 234 to the VCO 231 if the level of the switching control signal Sc is LOW.

The switching circuit 212 supplies the output signal of the transmission circuit 211 to the first antenna 29 if the level of the switching control signal Sc is HIGH, and to the second antenna 30 if the level of the switching control signal Sc is LOW.

At this point, the cycle of the switching control signal Sc supplied from the MCU 26 to the transmission circuit 211 and the switching circuit 212 is sufficiently short compared with that of the information signal so that a switching between the first and second carrier frequencies f1 and f2 is performed with the information signal being in the same state.

The switching control signal Sc may be diffusion data.

According to this embodiment, a signal transmission can be performed through the single transmission circuit 211, thus simplifying a structure of the input device 210 and reducing the production cost thereof.

Further, in order to improve transmission efficiency, the input device 1, 100, or 200 may be operated on a special mouse pad (pad member) therefor.

FIG. 10 is a diagram showing an input system 300 according a fourth embodiment of the present invention. In FIG. 10, the same elements as those of FIG. 1 are referred to by the same numerals, and a description thereof will be omitted.

The input system 300 includes the input device 11 operated on a mouse pad (pad member) 301. The mouse pad 301 is defined by a reflector 302 and a director 303. The reflector 302 is formed of conductive wire, and is provided on an end portion of the mouse pad 301 in a direction indicated by arrow A2. A length L302 of the reflector 302 is given by the following expression:

$$L302 \leq 0.50 \times (\lambda \times a) = 0.50\lambda'$$

where $\lambda$ is a wavelength of a transmission wave, a is a wavelength shortening rate, and $\lambda' = (\lambda \times a)$.

The director 303 is formed of conductive wire, and is provided on an end portion of the mouse pad 301 in a direction indicated by arrow A1. A length L303 of the director 303 is given by the following expression:

$$L303 \leq 0.43 \times (\lambda \times a) = 0.43\lambda'$$

A distance d between the reflector 302 and the director 303 is given by the following expression:

$$0.14\lambda' \leq d \leq 0.4\lambda'$$

According to the above-described structure, the transmission wave radiated from the input device 11 has directivity in the A1 direction, so that the transmission wave is efficiently transmitted to the reception circuit 12 by providing the reception antenna in the A1 direction.

The lengths L302 and L303 of the above-described reflector 302 and the director 303, and the distance d between the reflector 302 and the director 303 are based on the Yagi-Uda antenna theory.

In this embodiment, the directivity is produced by embedding the conductive wire in the mouse pad 301. However, the directivity can be obtained by embedding or applying the conductive wire in or on the operation surface of a desk on which the input device 11 is operated.

Further, in this embodiment, it is possible to have the user serve as an antenna by providing a conductor on the surface of the input device 11 so that the signal is transmitted via the conductor to the user touching the conductor. The same effect can be obtained by operating the input device 100 or 200 on the mouse pad 301.

Figure 12A:
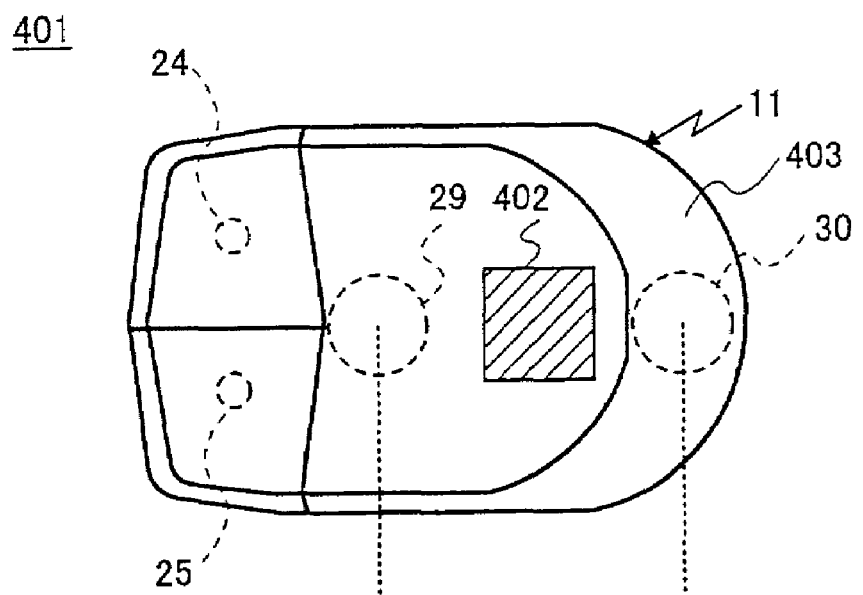
FIGS. 12A and 12B are a top plan view and a side view of an input device of the fifth embodiment, respectively.
Figure 12B:
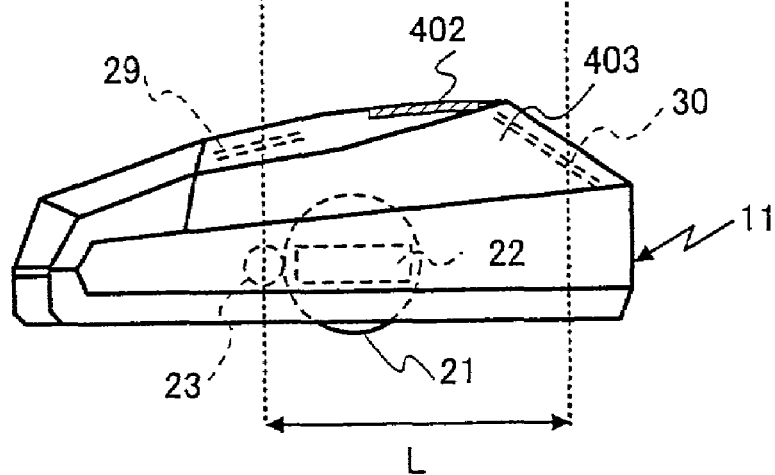

FIG. 11 is a block diagram of an input system 400 according to a fifth embodiment of the present invention. FIGS. 12A and 12B are a top plan view and a side view of an input device 401 of the input system 400, respectively. In FIGS. 11, 12A, and 12B, the same elements as those of FIGS. 1, 5A, and 5B are referred to by the same numerals, and a description thereof will be omitted.

The input device 401 includes a conductive part 402 to which the output signals of the first and second transmission circuits 27 and 28 are supplied. The conductive part 402 includes a conductor such as a metal plate, and is exposed on the surface of a housing 403 of the input device 401 so as to be touched by the user.

According to this embodiment, a signal transmission can be performed efficiently with the user touching the conductive part 402.

Although the signal transmission is performed via the user touching the conductive part 402 in this embodiment, the transmission signal may be supplied to an operation surface on which the input device 401 is operated by forming the operation surface of a conductor and contacting a conductor formed on the surface of the input device 401 with the operation surface.

Figure 13:
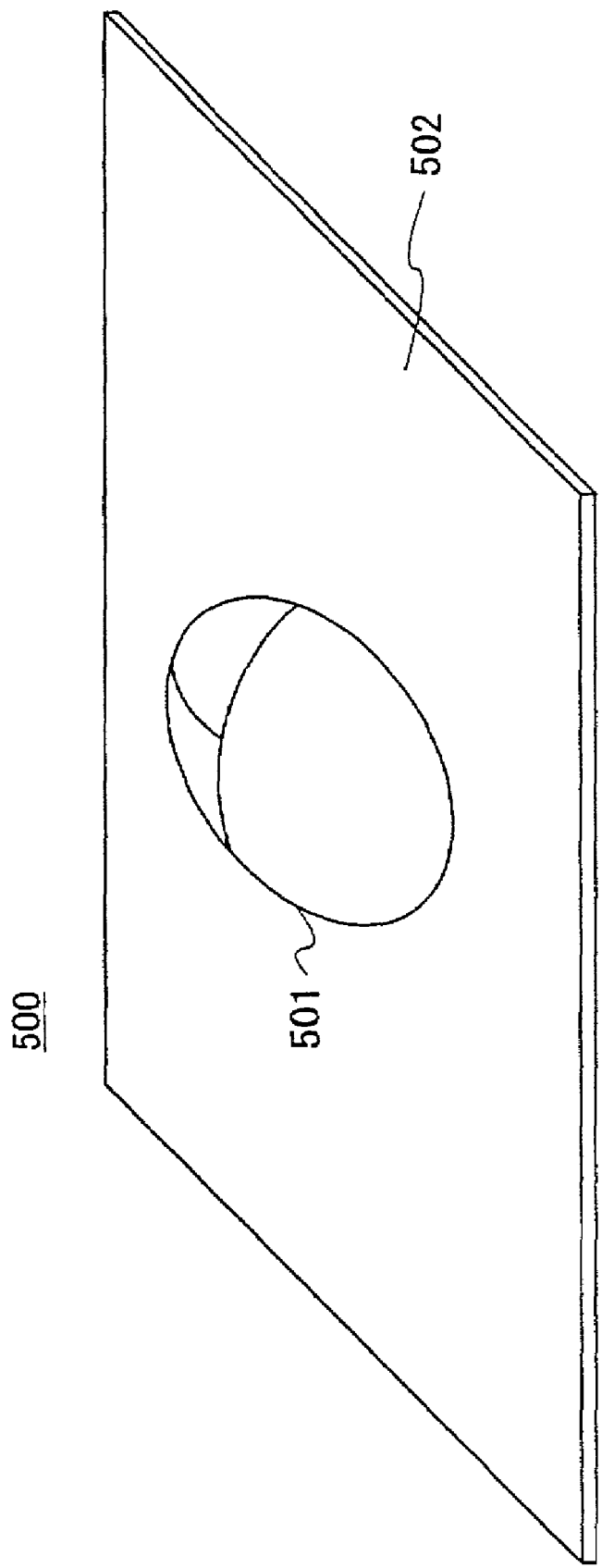
FIG. 13 is a diagram showing an input system according to a sixth embodiment of the present invention.
Figure 15A:
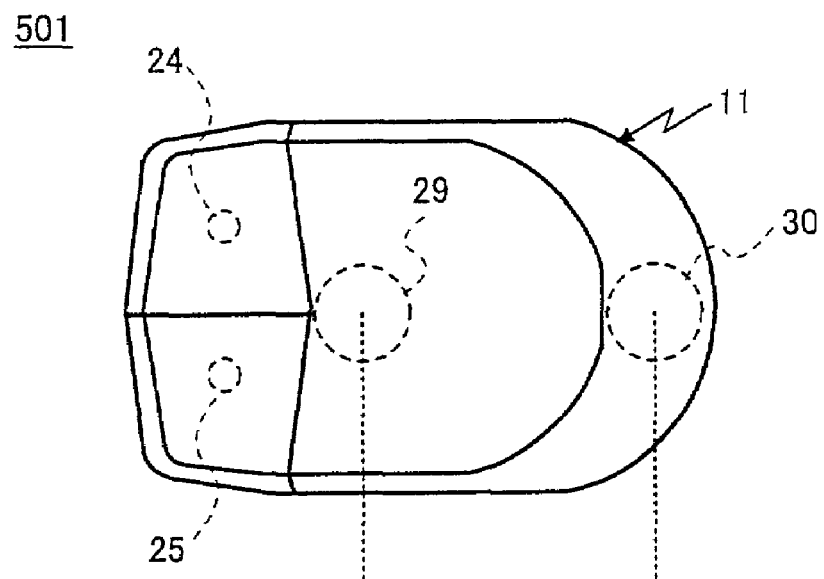
FIGS. 15A and 15B are a top plan view and a side view of an input device of the sixth embodiment, respectively.
Figure 15B:
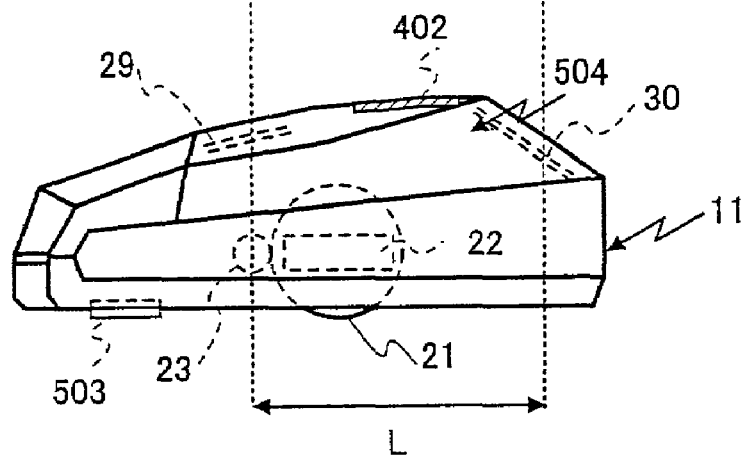

FIG. 13 is a diagram showing an input system 500 according to a sixth embodiment of the present invention. FIG. 14 is a block diagram of the input system 500. FIGS. 15A and 15B are a top plan view and a side view of an input device 501 of the input system 500, respectively. In FIGS. 13, 14, 15A, and 15B, the same elements as those of FIGS. 1, 5A, and 5B are referred to by the same numerals, and a description thereof will be omitted.

The input system 500 includes the input device 501 operated on a conductive operation plate 502. The input device 501 includes a conductive part 503 to which the output signals of the first and second transmission circuits 27 and 28 are supplied. The conductive part 503 includes a conductor such as a metal plate, and is exposed on the bottom surface of a housing 504 of the input device 501 so as to contact the operation plate 502.

According to this embodiment, the conductive part 503 contacts the operation plate 502 to have the operation plate 502 serve as an antenna. Therefore, a signal transmission can be performed efficiently.

In this embodiment, the input device 501 is a mouse. However, the input device 501 is not limited to a mouse, but can be realized in the form of a keyboard.

Figure 17:
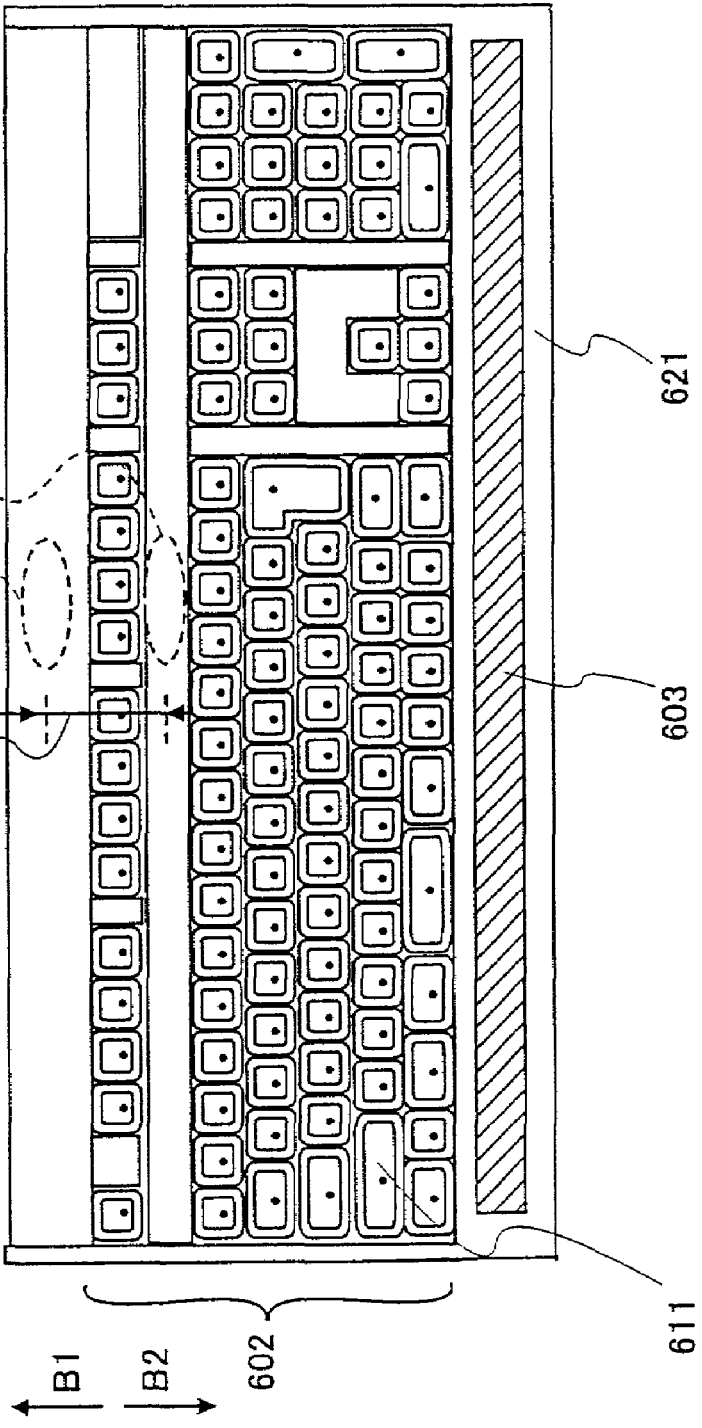
FIG. 17 is a diagram showing an input device 601 of the seventh embodiment.

FIG. 16 is a block diagram of an input system 600 according to a seventh embodiment of the present invention. FIG. 17 is a diagram showing an input device 601 of the input system 600. In FIGS. 16 and 17, the same elements as those of FIG. 1 are referred to by the same numerals, and a description thereof will be omitted.

The input system 600 differs from the input system 1 in an input device structure. The input device 601 includes a key entry part 602 and a conductive part 603 instead of the coordinate detection ball 21, the sensors 22 and 23, and the switches 24 and 25.

The key entry part 602 includes key buttons 611, a membrane switch part 612 including individual membrane switches. A membrane switch is switched ON by pressing down a corresponding one of the key buttons 611, and a code corresponding to the membrane switch is recognized by the MCU 26. The code recognized by the MCU 26 is subjected to modulation in the first and second transmission circuits 27 and 28 to be transmitted from the first and second antennas 29 and 30 and from the user via the conductive part 603. The conductive part 603 is exposed on a palm rest 621 so as to be contacted by the user performing input operations by keying.

The first antenna 29 is provided on an end portion of the input device 601 in a direction indicated by arrow B1, and the second antenna 30 is placed at a distance L from the first antenna 29 in a direction indicated by arrow B2.

According to this embodiment, a signal transmission can be performed efficiently because not only the first and second antennas 29 and 30 transmit the transmission waves but also the user transmits the transmission wave by contacting the conductive part 603.

The first and second antennas 29 and 30 may be formed in a pattern on the membrane switch part 612.

Figure 18:
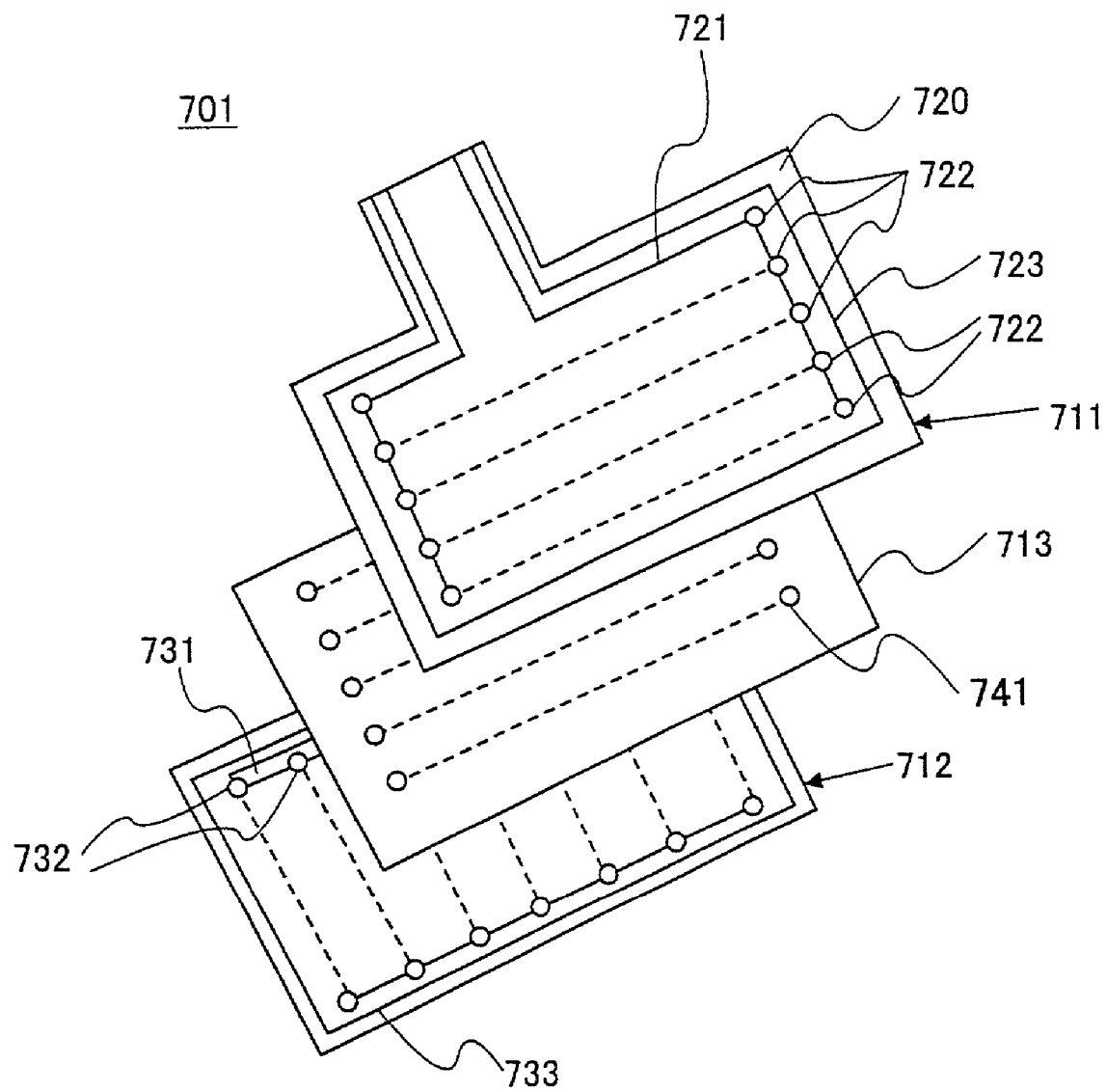
FIG. 18 is an exploded perspective view of a membrane switch part that is a variation of a membrane switch part of the seventh embodiment.

FIG. 18 is an exploded perspective view of a membrane switch part 701 that is a variation of the membrane switch part 612 of the seventh embodiment.

The membrane switch part 701 includes an upper membrane sheet 711, a lower membrane sheet 712, and an insulating sheet 713. The upper membrane sheet 711 includes a resin sheet 720 on which a wiring pattern 721, electrodes 722, and an antenna pattern 723 forming the first antenna 29 are formed.

The lower membrane sheet 712 includes a resin sheet 730 on which a wiring pattern 731, electrodes 732, and an antenna pattern 733 forming the second antenna 30 are formed. The electrodes 732 are formed to oppose the electrodes 722 of the upper membrane sheet 711.

The insulating sheet 713 is interposed between the upper and lower membrane sheets 711 and 712 to insulate the wiring patterns 721 and 731. Hole parts 741 are formed in the insulating sheet 713 to form spaces between the electrodes 722 and 732. The key buttons 611 are provided above the electrodes 722 and 732. When the key buttons 611 are not pressed down, the electrodes 722 and 732 are separated by the spaces formed therebetween. When one of the key buttons 611 is pressed down, the corresponding electrodes 722 and 732 contact so that an electric current flows therebetween. As a result, the pressed one of the key buttons 611 is detected.

The first and second antennas 29 and 30 are formed to be loop antennas by the antenna patterns 723 and 733, respectively.

According to this variation, it is not necessary to separately provide the first and second antennas 29 and 30 because the first and second antennas 29 and 30 are formed as the antenna patterns 723 and 733.

In the first through seventh embodiments, only two antennas are provided for simplicity purposes. However, the number of antennas is not limited to two, and more than two antennas or transmission or reception circuits may be provided.

Figure 19:
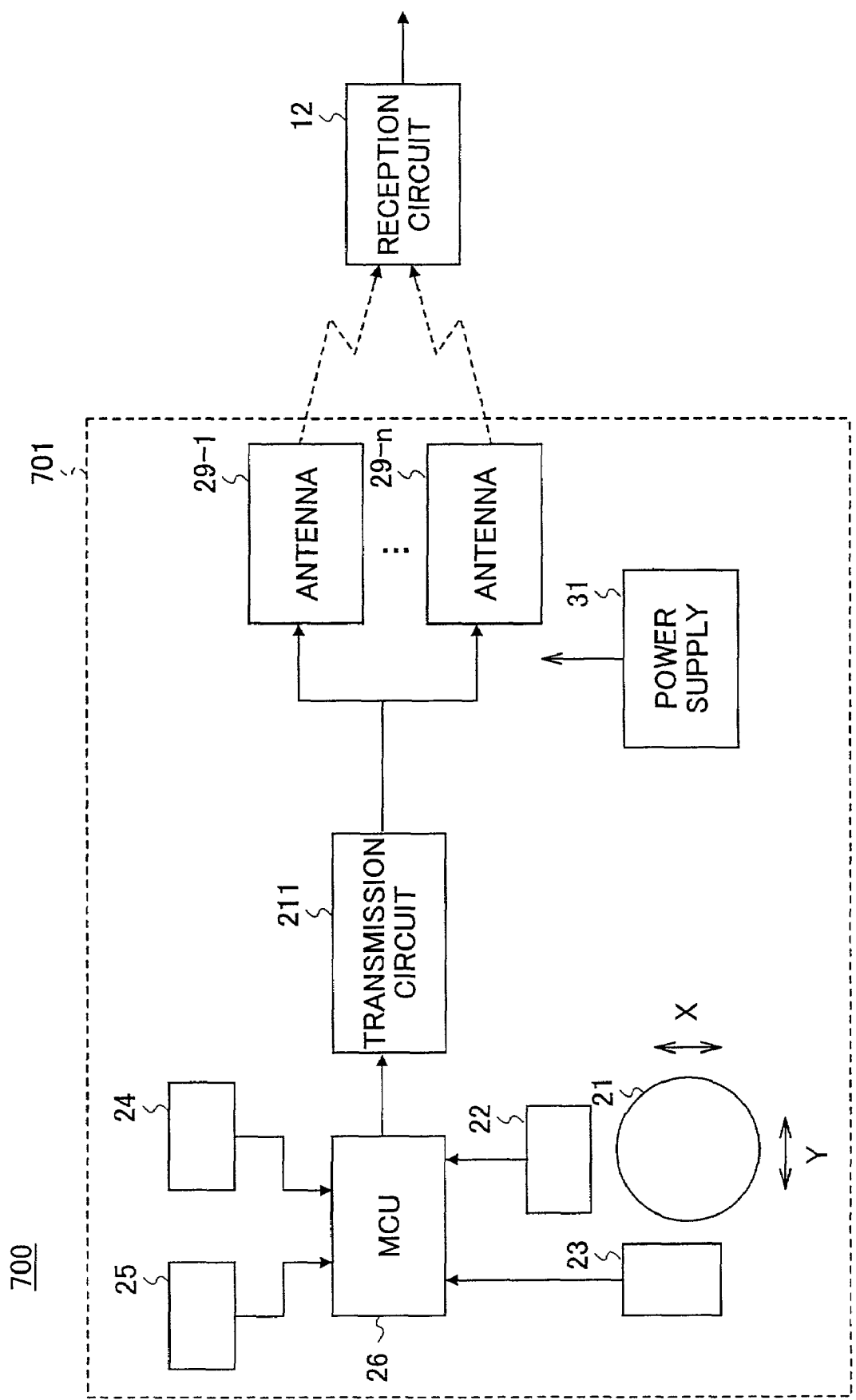
FIG. 19 is a block diagram of an input system according to an eighth embodiment of the present invention.

FIG. 19 is a block diagram of an input system 700 according to an eighth embodiment of the present invention.

As shown in FIG. 19, a transmission signal of a single carrier frequency transmitted from the first transmission circuit 27 may be output from a plurality of antennas 29-1 through 29-n. This structure produces space diversity effect, thus realizing an efficient signal transmission irrespective of a state of an input device 701.

FIG. 20 is a block diagram of an input system 800 according to a ninth embodiment of the present invention.

As shown in FIG. 20, the antennas 29-1 through 29-n may have corresponding transmission circuits 27-1 through 27-n. This structure allows the output strength of each of the antennas 29-1 through 29-n to be adjusted easily to an optimum value.

Further, a plurality of antennas AR-1 through AR-n may be provided on the side of the reception circuit 12. This structure makes space diversity more effective.

The present invention is not limited to the specifically disclosed embodiments, but variations and modifications may be made without departing from the scope of the present invention.

The present application is based on Japanese priority application No. 2000-346994 filed on Nov. 14, 2000, the entire contents of which are hereby incorporated by reference.

What is claimed is:

1. An input system, comprising:
an information generation part generating input information based on a given input operation;
a transmission part generating a signal by having a carrier frequency modulated with the input information, and transmitting the generated signal;
a plurality of wave direction parts provided close to said transmission part so as to provide the signal transmitted from said transmission part with directivity; and
a reception part receiving the transmitted signal through each of the wave direction parts and demodulating the received signals into the same input information,
wherein the signal transmitted at a timing from the transmission part is provided alternately to the wave direction parts so that the same input information is transmitted alternately through the wave direction parts.

2. The input system as claimed in claim 1, further comprising:
a switching part switchable between said wave direction parts based on a control signal supplied from said information generation part so that each of the signals transmitted from the transmission part is supplied to a corresponding one of the wave direction parts.

3. The input system as claimed in claim 1, wherein said transmission part comprises a plurality of transmission circuits for transmitting the signal.

4. The input system as claimed in claim 1, wherein said wave direction parts are antennas.

5. An input device, comprising:
an information generation part generating input information based on a given input operation;
a transmission part generating a signal by having a carrier frequency modulated with the input information, and transmitting the generated signal; and
a plurality of wave direction parts provided close to said transmission part so as to provide the signal transmitted from said transmission part with directivity,
wherein the signal transmitted at a timing from the transmission part is provided alternately to the wave direction parts so that the same input information is transmitted alternately through the wave direction parts.

6. The input device as claimed in claim 5, further comprising:
a switching part switchable between said wave direction parts based on a control signal supplied from said information generation part so that each of the signals transmitted from the transmission part is supplied to a corresponding one of the wave direction parts.

7. The input device as claimed in claim 5, wherein said transmission part comprises a plurality of transmission circuits transmitting the signal, the transmission circuits corresponding to the wave direction parts.

8. The input device as claimed in claim 5, wherein said wave direction parts are antennas.

* * * * *